ized that the sound and/or picture contents, once received,
(12) United States Patent  
Sedlmeyer

(10) Patent No.: US 9,077,953 B2  
(45) Date of Patent: Jul. 7, 2015

(54) METHOD AND ARRANGEMENT FOR RETRANSMITTING AS WELL AS PROCESSING AND/OR DISPLAYING AND/OR STORING OF SOUND AND/OR PICTURE CONTENTS, AND DEVICE FOR PROCESSING AND/OR DISPLAYING AND/OR STORING OF SOUND AND/OR PICTURE CONTENTS

(71) Applicant: Institut fuer Rundfunktechnik GmbH, Munich (DE)

(72) Inventor: Robert Sedlmeyer, Munich (DE)

(73) Assignee: Institut Fuer Rundfunktechnik GmbH, Munich (DE)

(*) Notice: Subject to any disclaimer, the term of this patent is extended or adjusted under 35 U.S.C. 154(b) by 0 days.

(21) Appl. No.: 13/727,221

(22) Filed: Dec. 26, 2012

(65) Prior Publication Data

US 2013/0114941 A1 May 9, 2013

Related U.S. Application Data

(63) Continuation of application No. 11/630,201, filed as application No. PCT/EP2006/002884 on Mar. 30, 2006.

(30) Foreign Application Priority Data

Jul. 15, 2005 (DE) .......................... 10 2005 033 285

(51) Int. Cl.
   *H04N 9/80* (2006.01)
   *H04N 9/79* (2006.01)
   (Continued)

(52) U.S. Cl.
   CPC ................ *H04N 9/79* (2013.01); *H04N 5/913* (2013.01); *H04N 21/4408* (2013.01); *H04N 2005/91364* (2013.01)

(58) Field of Classification Search
   None
   See application file for complete search history.

(56) References Cited

U.S. PATENT DOCUMENTS 6,996,236 B1 * 2/2006 England et al. ............... 380/213
7,212,634 B2 5/2007 Briscoe
(Continued)

FOREIGN PATENT DOCUMENTS

JP 2001-326920 A 11/2001
JP 2002-262227 A 9/2002
(Continued)

OTHER PUBLICATIONS

Ernesto Damiani, DTI—Unibersita Di Milano: "XML and Security" XML and Security [Online] Nov. 2003 (1001-11)11, XP002389008.
(Continued)

*Primary Examiner* — William C Vaughn, Jr.
*Assistant Examiner* — Daniel Tekle
(74) *Attorney, Agent, or Firm* — Venable LLP; Robert Kinberg; Todd R. Farnsworth

(57) ABSTRACT

A special instruction for not encoding a content is incorporated into access authorization data contained in the received signal, so that within a unified system for transmitting and receiving of encoded or non-encoded sound and/or picture contents, it is possible to meet the requirement of public broadcasting and "free-to-air" program providers for a non-encoded processing and/or display and/or storage of freely accessible contents for the end user. The instruction signalizes that the sound and/or picture contents, once received, must be available in the non-encoded form to the end user. The access authorization data remain added to the sound and/or picture contents, even in cases of a cascading, encoded retransmission, or remains logically linked thereto by suitable means, even if transmitted physically separate along with the picture and/or sound contents. During the processing and/or display and/or storage of the picture and/or sound contents retransmitted in the encoded form, the special instruction triggers a decoding of the picture and/or sound contents, at least at the end of the retransmission cascade.

1 Claim, 3 Drawing Sheets

Figure 1:
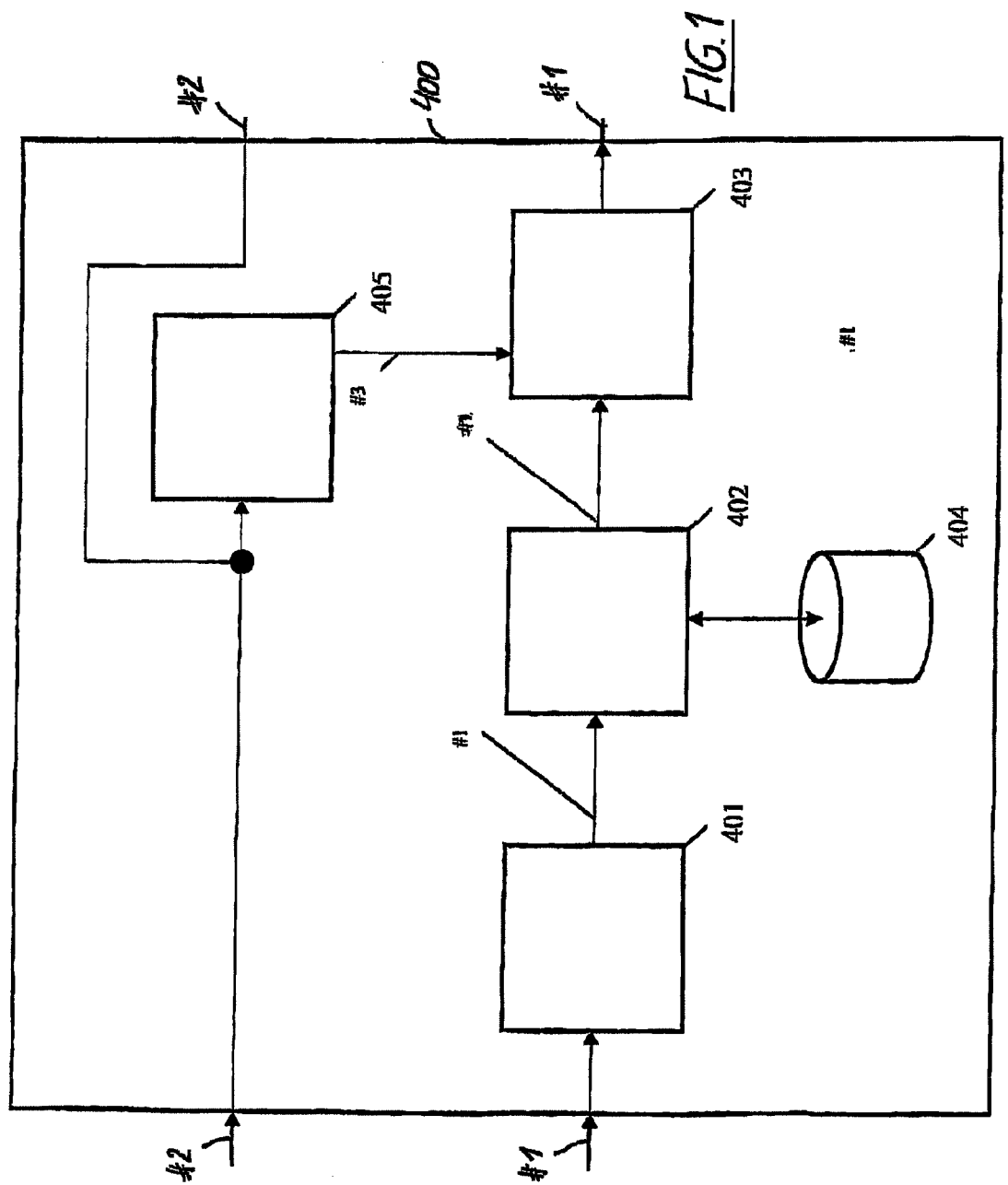

(51) Int. Cl.
*H04N 5/913* (2006.01)
*H04N 21/4408* (2011.01)

(56) References Cited

U.S. PATENT DOCUMENTS

| | | | |
|---|---|---|---|
| 7,877,811 | B2 | 1/2011 | Sedlmeyer |
| 2002/0176576 | A1 | 11/2002 | Abe et al. |
| 2002/0186844 | A1 | 12/2002 | Levy et al. |
| 2003/0041245 | A1 | 2/2003 | Chan et al. |
| 2003/0076955 | A1 | 4/2003 | Alve et al. |
| 2006/0182279 | A1 | 8/2006 | Maruo et al. |
| 2007/0133806 | A1 | 6/2007 | Asano |
| 2008/0063196 | A1* | 3/2008 | Evans et al. ............ 380/200 |

FOREIGN PATENT DOCUMENTS

| | | |
|---|---|---|
| WO | WO-03/034313 | 4/2003 |
| WO | WO-03/039155 A | 5/2003 |
| WO | WO-03/076955 A1 | 9/2003 |
| WO | WO-03/098931 A | 11/2003 |
| WO | WO-2005/048579 A2 | 5/2005 |

OTHER PUBLICATIONS

DVB: "CPCM Reference Model, Working Draft"—Digital Video Broadcasting (DVB) Content Protection and Copy Management (CPCM) System, [Online] Jun. 28, 2005, XP002389009.

DVB: "Usage State Information (USI), Working Draft," Digital Video Broadcasting (DVB) Content Protection and Copy Management (CPCM) System, [Online], Jun. 28, 2005, XP002389010.

International Search Report Dated Jul. 15, 2006, Issued in PCT/EP2006/002884.

Japanese Office Action from corresponding Japanese Patent Application No. 2008-520725, dated Jun. 1, 2011.

Japanese Office Action from corresponding Japanese Patent Application No. 2008-520725, dated Nov. 30, 2011.

Japanese Office Action from corresponding Japanese Patent Application No. 2008-520725, mailed Mar. 28, 2012.

Japanese Office Action from corresponding Japanese Patent Application No. 2012-042654, mailed Apr. 24, 2013.

Japanese Office Action from corresponding Japanese Patent Application No. 2012-042655, mailed Apr. 19, 2013.

\* cited by examiner

METHOD AND ARRANGEMENT FOR RETRANSMITTING AS WELL AS PROCESSING AND/OR DISPLAYING AND/OR STORING OF SOUND AND/OR PICTURE CONTENTS, AND DEVICE FOR PROCESSING AND/OR DISPLAYING AND/OR STORING OF SOUND AND/OR PICTURE CONTENTS

RELATED APPLICATIONS

This patent application is a continuation of U.S. patent application Ser. No. 11/630,201 filed on Dec. 21, 2006, which was a U.S. National Stage of International Application No. PCT/EP2006/002884, filed Mar. 30, 2006. U.S. patent application Ser. No. 11/630,201 and PCT/EP2006/002884 are hereby incorporated by reference in their entirety.

The invention relates to a method and an arrangement for retransmitting as well as processing and/or displaying and/or storing of sound and/or picture contents. The invention further relates to a device for processing and/or displaying and/or storing of sound and/or picture contents.

The illegal copying of pre-recorded media with protected sound and/or picture contents with the aid of personal computer programs has led to a series of technical measures to prevent the illegal copying or to make it more difficult. In contrast to such copy-protect systems, the "Content Protection and Copy Management" (CPCM) systems make it possible to use the contents of a recording medium, but only under specific licensing conditions. The basic idea behind CPCM systems is to specify a separate signal for each authorized use of its content, wherein these signals are added to the picture and/or sound signals and are analyzed by suitable receivers. American producers of picture and/or sound contents envision the use of up to 55 different types of signals for not only controlling the copying of the contents, but also the operations carried out with the contents, and to the smallest detail the spatial use of the content only in "authorized domains" (meaning authorized areas, for example in the home of the authorized user).

However, the conversion of numerous signals of this type inside consumer electronic devices is involved and expensive and will most likely result in increased prices, wherein respective processes will be realized not only in consumer electronic devices, but also in future PCs. Already in use are so-called conditional access (CA) systems, which make it possible for pay TV providers to control access to encoded picture and/or sound contents through the use of smart cards. However, these are not sufficient by themselves to meet the higher requirements to be met by CPCM systems and must be expanded correspondingly. As soon as the contents decoded with the aid of a smart card are made available at a device output, the contents can be displayed, processed or stored without problem when using only CA systems. A further development in this area is the so-called macrovision signal, which is designed to permit only the display of a pay-TV program on the television monitor, but not the recording of the program with the aid of a video recorder.

On the other hand, a CPCM system based exclusively on the process of encoding is in principle not acceptable to public broadcasting as well as to "free-to-air" radio program providers. Even in the future, the contents transmitted by these radio program providers are to remain non-encoded, so that they can be recorded without restrictions. The transfer to interfaces between various display devices in the home of the consumer also must take place without encoding. With wireless systems such as the wireless LAN (W-LAN) system, on the other hand, it makes sense to encode the contents transmitted to the home of the consumer in order to prevent neighbors from listening in. In particular PC's with Internet access and set-top-boxes for the wireless reception are networked with other devices in the home of a consumer by using wireless home systems of this type, without cabling expenditure.

It is therefore the object of the present invention to provide options which meet the requirements of public broadcasting and "free-to-air" program providers for a non-encoded processing and/or display and/or storage of freely accessible contents for the end user, within a uniform system for transmitting and receiving of encoded or non-encoded sound and/or picture contents.

This object is solved for a method and a device of the aforementioned type in that special access authorization data, contained in the receiving signal, remain added to the sound and/or picture contents and signal that the sound and/or picture contents are to be made available non-encoded to the end user following the reception if applicable, even when using a cascading, encoded retransmission. During the processing and/or display and/or storage of the picture and/or sound contents retransmitted in the encoded form, the special access authorization data trigger a decoding of the picture and/or sound contents at least at the end of the retransmission cascade.

The independent claim 3 discloses a device for use with the method according to the invention and the arrangement according to the invention.

The invention is based on the idea of providing this picture and/or sound contents, which is to be made available free and non-encoded to the end user, with special access authorization data that "adhere" to the picture and/or sound contents even during repeated encoding and decoding operations along the distribution path, or which are logically link to it, even if the data are transmitted/stored separately from the sound and/or picture contents and at different locations, wherever possible or useful, but which trigger a decoding of the picture and/or sound contents for the end user at least at the end of the distribution path, provided the content is encoded.

Figure 2:
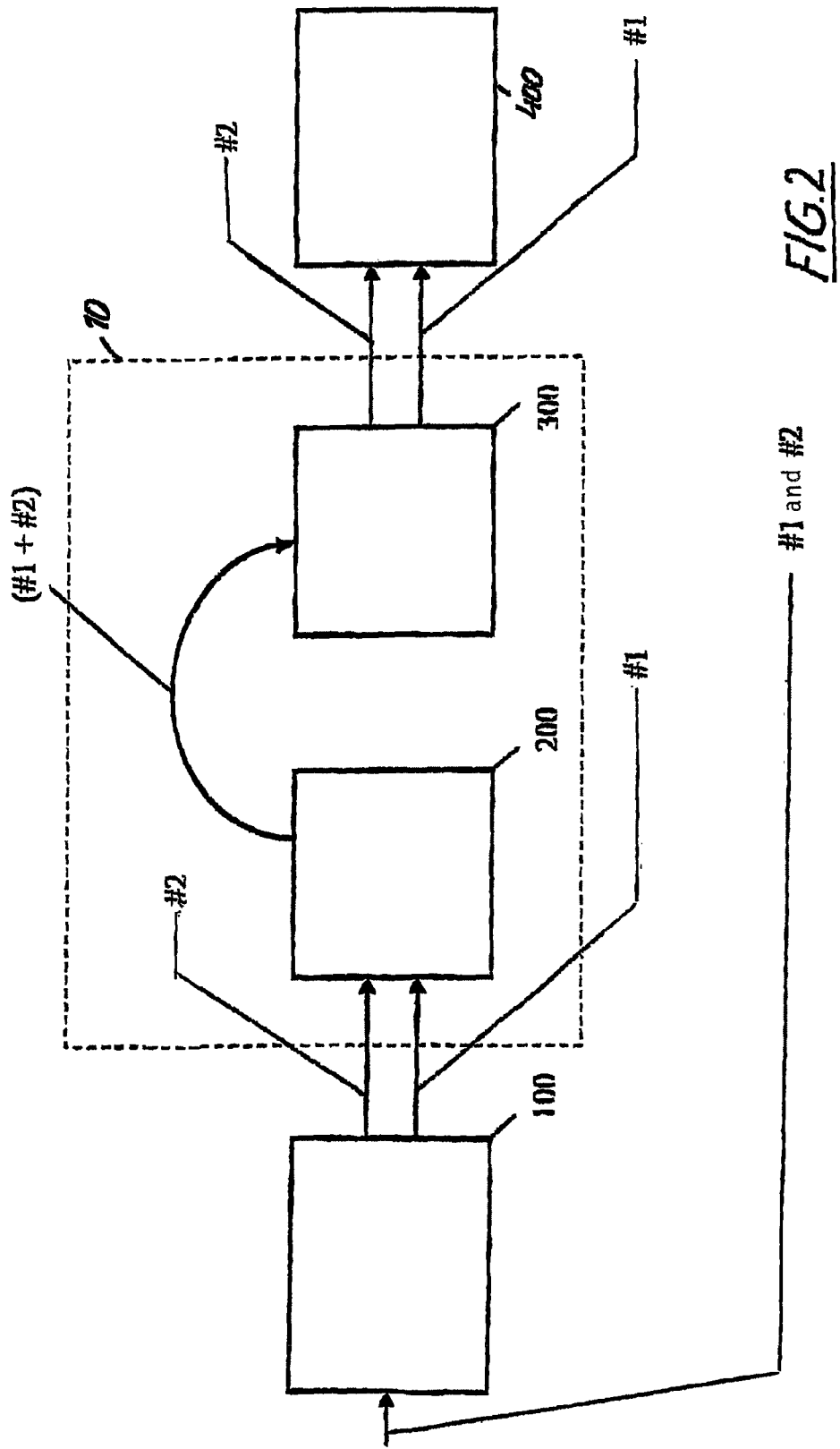
Figure 3:
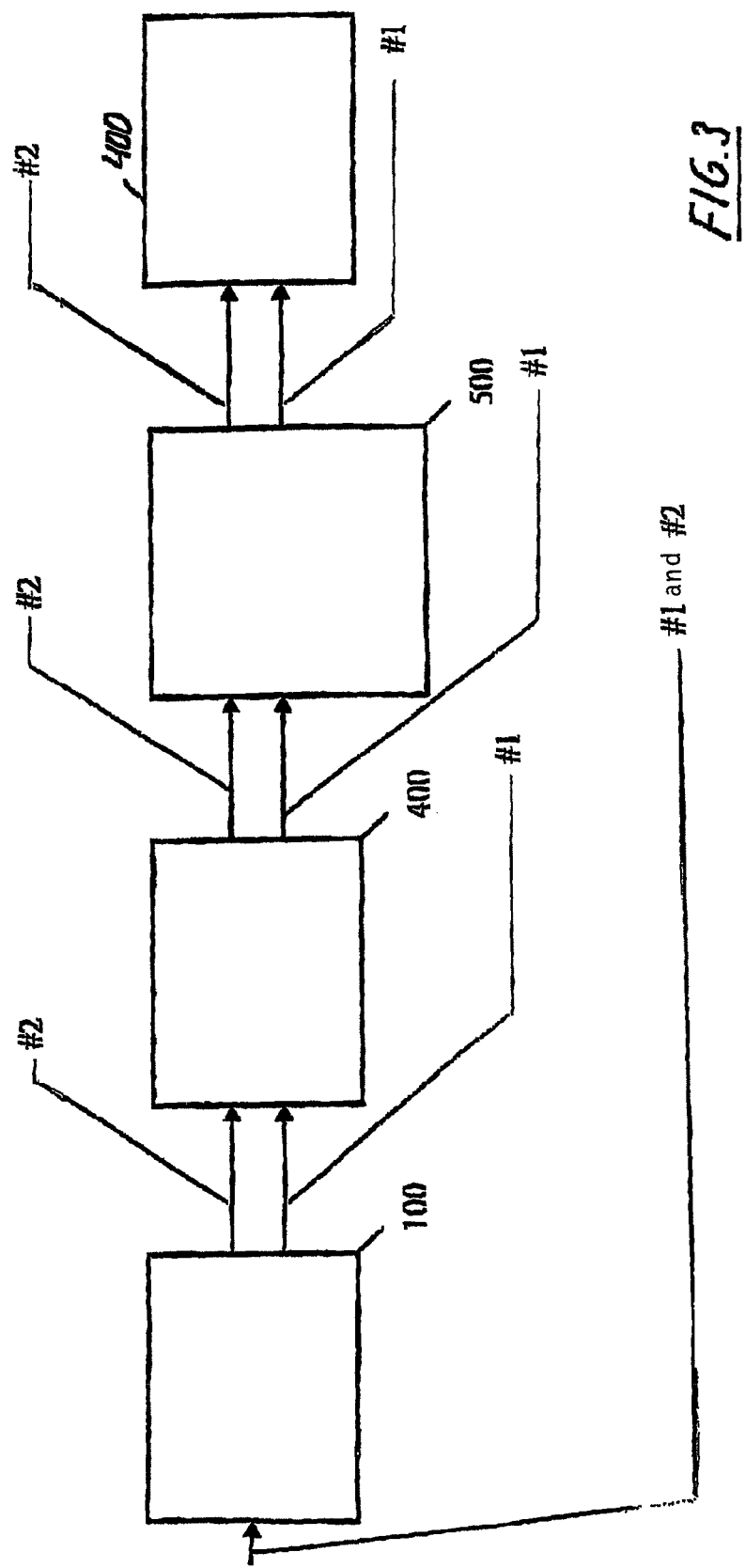

The invention is explained in further detail in the following, with reference to the exemplary embodiments in the drawings, which show in:

FIG. 1 A block diagram of a consumer electronic device according to the invention;

FIG. 2 A block diagram of an isolated network in the home of an end user for receiving encoded or non-encoded picture and/or sound signals to be retransmitted to a consumer electronic device according to FIG. 1; and FIG. 3 A block diagram of a cascade of receivers and memories for retransmitting picture and/or sound contents, received from optional transmission networks.

The consumer electronic device 400, shown in FIG. 1, receives the encoded or non-encoded picture and/or sound contents 1 from a non-depicted transmission network, along with the access authorization data 2. According to the invention, the access authorization data 2 always remain added to or logically linked by suitable means to the sound and/or picture contents 1, even if transmitted physically separate from the picture and/or sound contents 1, regardless of whether the contents 1 are encoded or decoded along the transmission path to a display or storage device in the home of the end user. The access authorization data 2 trigger a decoding of the picture and/or sound contents at least at the end of each transmission or retransmission, provided the data are encoded.

For the example shown in FIG. 1, an encoded input signal of the device 400 is fed to a therein provided decoder 401 and is decoded. A non-encoded input signal is fed unchanged through the decoder 401. The non-encoded picture and sound content at the output of the decoder 401 is then processed in a following stage 402 and, if applicable, is stored in a memory 404. Following this, the processed picture and/or sound content is supplied to an encoder 403, which is connected via a control input to an analyzer 405. The analyzer 405 analyzes the complete transmitted access authorization data 2 and filters out a possibly existing instruction 3 for not encoding the content. This instruction 3 is retransmitted to the encoder 403 where it prevents an encoding. The encoder 403 thus encodes the processed picture and/or sound content only if the access authorization data 2 do not contain the instruction 3. The output of the encoder 403 forms the output for the device 400 to which the access authorization data 2 are added once more.

FIG. 2 shows a wireless isolated network 10 in the home of an end user, which is provided with a W-LAN transmitter 200 and a W-LAN receiver 300. The W-LAN transmitter 200 is connected via an interface to an input stage 100, which receives the encoded or non-encoded picture and/or sound contents 1 together with the access authorization data 2 from an optional transmission network, such as the Internet or a broadcasting network. The input stage 100 comprises a primary receiver and, if applicable, a decoder 100.

The W-LAN transmitter 200 transmits the picture and/or sound contents 1 wireless and encoded to the W-LAN receiver 300. The W-LAN receiver 300 is connected via a different interface to a consumer electronic device 400, which can be embodied as shown in FIG. 1. It is critical that the access authorization data 2 are fed through the isolated network 10 or remain logically linked by suitable means, even if transmitted physically separate from the picture and/or sound contents 1, so that the access authorization data 2 are transmitted together with the retransmitted picture and/or sound content to the consumer electronic device 400.

FIG. 3 illustrates the principle of combining the picture and/or sound content 1 with the access authorization data 2 by using a cascade of consumer electronic devices 400, 500, and 600, provided with decoders and encoders. The picture and/or sound content 1 and the access authorization data 2 are jointly present at the output of the input stage 100, as well as the output of each consumer electronic device 400 and 500, regardless of whether or not a decoding and/or encoding occurs within the separate devices 100, 400, and/or 500. The final device 600 in the cascade of devices, shown herein, thus receives the picture and/or sound content 1 together with the access authorization data 2, wherein this triggers a decoding of the picture and/or sound content 1 in the device 600, provided the content 1 is encoded at some point along the transmission path.

What is claimed is:

1. A consumer-electronic device for receiving an input digital data stream comprising picture or audio information and authorization information, the device comprising:

a receiver configured to receive the authorization information from the input digital data stream, wherein the input digital data stream comprises encrypted picture or audio information and non-encrypted picture or audio information and the authorization information from the input digital data stream comprises an encryption instruction of a "disable encrypt" or an "enable encrypt" type and the receiver is adapted to retrieve the encryption instruction from said authorization information;

a decoder configured to decrypt received encrypted digital picture or audio information and generate decrypted picture or audio information;

an encoder configured to encrypt non-encrypted or decrypted picture or audio information, wherein:

an encrypted output digital data stream is generated by the encoder when the encryption instruction is of an "enable encrypt" type and the input digital data steam comprises non-encrypted picture or audio information, an encrypted output digital data stream is generated by the encoder when the encryption instruction is of an "enable encrypt" type and the input digital data steam comprises encrypted picture or audio information, and a non-encrypted output digital data stream is generated by the decoder when the encryption instruction is of a "disable encrypt" type and the input digital data steam comprises non-encrypted picture or audio information, a non-encrypted output digital data stream is generated by the decoder when the encryption instruction is of a "disable encrypt" type and the input digital data steam comprises encrypted picture or audio information; and a transmitter configured to supply an output digital data stream of encrypted or non-encrypted picture or audio information, wherein the transmitter is adapted to include the authorization information into the output digital data stream.

* * * * *